United States Patent
Khosrowpour et al.

(10) Patent No.: US 11,496,601 B2
(45) Date of Patent: Nov. 8, 2022

(54) CLIENT DRIVEN CLOUD NETWORK ACCESS SYSTEM AND METHOD

(71) Applicant: Dell Products, L.P., Round Rock, TX (US)

(72) Inventors: Farzad Khosrowpour, Pflugerville, TX (US); Mitchell Anthony Markow, Hutto, TX (US); Liam B. Quinn, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 29 days.

(21) Appl. No.: 17/148,345

(22) Filed: Jan. 13, 2021

(65) Prior Publication Data

US 2022/0224770 A1  Jul. 14, 2022

(51) Int. Cl.
| | |
|---|---|
| *H04L 67/61* | (2022.01) |
| *H04L 67/10* | (2022.01) |
| *G06N 20/00* | (2019.01) |
| *H04L 47/70* | (2022.01) |
| *H04L 67/63* | (2022.01) |
| *H04L 41/50* | (2022.01) |

(52) U.S. Cl.
CPC ............ *H04L 67/61* (2022.05); *G06N 20/00* (2019.01); *H04L 41/5096* (2013.01); *H04L 47/82* (2013.01); *H04L 67/10* (2013.01); *H04L 67/63* (2022.05)

(58) Field of Classification Search
None
See application file for complete search history.

(56) References Cited

U.S. PATENT DOCUMENTS

| | | | |
|---|---|---|---|
| 8,244,874 B1* | 8/2012 | Thireault | H04L 41/0806 709/226 |
| 8,339,979 B2* | 12/2012 | Perino | H04L 47/2475 370/252 |
| 11,271,810 B1* | 3/2022 | Guzik | H04L 43/10 |
| 11,297,614 B2* | 4/2022 | Zhang | H04W 72/0406 |
| 2004/0264454 A1* | 12/2004 | Rajkumar | H04L 65/65 370/389 |
| 2011/0035272 A1* | 2/2011 | Bhatt | G06Q 30/0247 705/14.42 |

(Continued)

*Primary Examiner* — Lashonda Jacobs-Burton
(74) *Attorney, Agent, or Firm* — Fogarty LLP

(57) ABSTRACT

Embodiments of systems and methods for a client driven cloud network access system and method are described. In an illustrative, non-limiting embodiment, an IHS may include computer-executable instructions for receiving a request to perform an operation provided by a cloud service from an application, and generating an aggregated data packet including the request, a requested performance level to be provided by the service, and application telemetry data associated with a measured performance level of the application. The aggregated data packet is then transmitted to a plurality of servers that are each configured to provide the cloud service. Each of the servers generates and sends a response to the aggregated data packet that includes an advertised performance level at which the server can provide the cloud service. The IHS may then select one of the servers according to the advertised performance level, and communicate with the selected server to provide the requested operation.

17 Claims, 8 Drawing Sheets

(56) References Cited

U.S. PATENT DOCUMENTS

| | | | |
|---|---|---|---|
| 2012/0131144 A1* | 5/2012 | Cooper | H04L 67/10 709/219 |
| 2013/0080623 A1* | 3/2013 | Thireault | H04L 41/40 709/224 |
| 2014/0237085 A1* | 8/2014 | Park | H04L 65/612 709/219 |
| 2019/0045412 A1* | 2/2019 | Shivam | H04W 76/14 |
| 2019/0163546 A1* | 5/2019 | Ungar | G06F 11/3476 |
| 2019/0179944 A1* | 6/2019 | Ungar | H04L 41/0896 |
| 2019/0288934 A1* | 9/2019 | Chakra | H04L 45/70 |
| 2020/0167258 A1* | 5/2020 | Chattopadhyay | G06N 3/08 |
| 2020/0336398 A1* | 10/2020 | Thomas | H04L 43/0876 |
| 2021/0014133 A1* | 1/2021 | Maciocco | H04L 41/5006 |
| 2021/0144517 A1* | 5/2021 | Guim Bernat | G06F 9/4881 |
| 2021/0209501 A1* | 7/2021 | Sarferaz | G06F 9/547 |
| 2021/0342132 A1* | 11/2021 | Parthasarathy | G06F 11/302 |
| 2021/0365833 A1* | 11/2021 | Braddy | G06F 9/5072 |

\* cited by examiner

CLIENT DRIVEN CLOUD NETWORK ACCESS SYSTEM AND METHOD

FIELD

The present disclosure relates generally to Information Handling Systems (IHSs), and more particularly, to a client driven cloud network access system and method.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs often communicate through networks to perform processing tasks commonly referred to as cloud services. Generally, client IHSs establish communication through a network to a server IHS to perform many types of cloud services. Different types of networks support different types of communication at different data transfer rates. Example of networks include, but are not limited to, the Internet, the public switched telephone network (PSTN), and the wireless radio networks of cell phone telecommunication providers.

Fifth generation (5G) cellular networks have their service areas divided into smaller geographical areas or "cells." Wireless devices located in a cell connect to the 5G network by radio waves through an antenna. Unlike its predecessors, 5G networks support very large bandwidth communications, of up to 10 gigabits per second, yielding numerous new cloud services that can be provided. 5G also introduces the concept of cellular network slicing. Specifically, 5G network slicing enables the multiplexing of virtualized and independent logical networks on the same physical network infrastructure. Each network slice is an isolated end-to-end network tailored to fulfill diverse Quality-of-Service or "QoS" requirements requested by a given target application executed on the client IHS.

Conventional networks, such as 5G cellular networks, have heretofore utilized a top down (e.g., stovepipe) approach where performance parameters used for communicating with clients are pushed down to those clients from the cloud network without regard for any particular needs of applications running on those clients. That is, there currently exists no runtime state management between native and remote services to identify the best settings, configuration, and IO control for improved performance on the client devices. Current technology at best provides static settings that do not readily adapt to change and variations of workloads that often changes during client applications' run time behavior. It is with these concerns in mind that embodiments of the present disclosure are disclosed herein.

SUMMARY

Embodiments of systems and methods for a client driven cloud network access system and method are described. In an illustrative, non-limiting embodiment, an IHS may include computer-executable instructions for receiving a request to perform an operation provided by a cloud service from an application, and generating an aggregated data packet including the request, a requested performance level to be provided by the service, and application telemetry data associated with a measured performance level of the application. The aggregated data packet is then transmitted to a plurality of servers that are each configured to provide the cloud service. Each of the servers generates and sends a response to the aggregated data packet that includes an advertised performance level at which the server can provide the cloud service. The IHS may then select one of the servers according to the advertised performance level, and communicate with the selected server to provide the requested operation.

According to another embodiment a method includes receiving a request to perform an operation provided by a cloud service from an application, and generating, by a client IHS, an aggregated data packet including the request, a requested performance level to be provided by the service, and application telemetry data associated with a measured performance level of the application. The method further includes transmitting, by the IHS, the aggregated data packet to multiple servers that are each configured to provide the cloud service. Each of the servers generates and sends a response to the aggregated data packet that includes an advertised performance level at which the server can provide the cloud service. Accordingly, the method then selects, by the IHS, one of the servers according to the advertised performance level, and communicates with the selected server to provide the requested operation.

According to yet another embodiment, a memory storage device includes executable instructions for receiving a request to perform an operation from an application, generating an aggregated data packet, and transmitting the aggregated data packet to multiple servers that are each configured to provide the cloud service. The aggregated data packet includes the request, a requested performance level to be provided by the service, and application telemetry data associated with a measured performance level of the application. Each of the servers generates and sends a response to the aggregated data packet that includes an advertised performance level at which the server can provide the cloud service. The IHS may then select one of the servers according to the advertised performance level, and communicate with the selected server to provide the requested operation.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of the present disclosure provide a client driven cloud network access system and method that enables applications executed on client IHSs to select one service from among multiple services that optimally suit their particular needs (e.g., quality of service (QoS), throughput (bandwidth), latency requirements, reliability). Selection of a particular service is provided by a bidding process in which a client IHS transmits a request to provide an operation to multiple servers that each possess a candidate service to be used by the client IHS. In turn, each server estimates a performance level that its service can provide to the client IHS such that the client IHS may select one server that optimally provides the particular needs of the application running on the client IHS. Additionally, a cooperative machine learning (ML) technique may be performed by both client IHS and server to optimize performance of both application and service. This optimization of the application and service used by the application forms an affinity between the application and selected service so that when ensueing requests for the service are issued by the client IHS, the affinity between the selected service and application may allow the server to advertise better estimated performance levels than other server IHSs in the cloud network.

Currently, there exists no runtime state management between client IHSs (native devices) and servers (remote devices) to inform client IHSs about the best settings, configuration, and I/O control for improved performance. Current technology at best provides static settings that, in many cases, do not adapt to changes and variations of workloads and systems that provide those workloads. Client IHSs may have remote manager agents that adapt its operation according to connectivity and cloud protocols, but these remote manager agents do not possess any intelligence about certain requirements of applications that use the cloud services, such as prevention of potential security breaches that may be incurred thereby.

With the emergence of 5G Connectivity provided with differentiated features, such as low latency, increased throughput (e.g., bandwidth), and network capacity, the limitations of today's network connectivity may be significantly reduced. These improved network features will enable changes in being able to move parts of the native client computation, storage, and orchestration to the cloud network via improved services without impacting the user experience. Given these improved services, client IHSs can now operate with a relatively high degree of availability and reliability to deliver improved performance for various workloads and applications.

Figure 1:
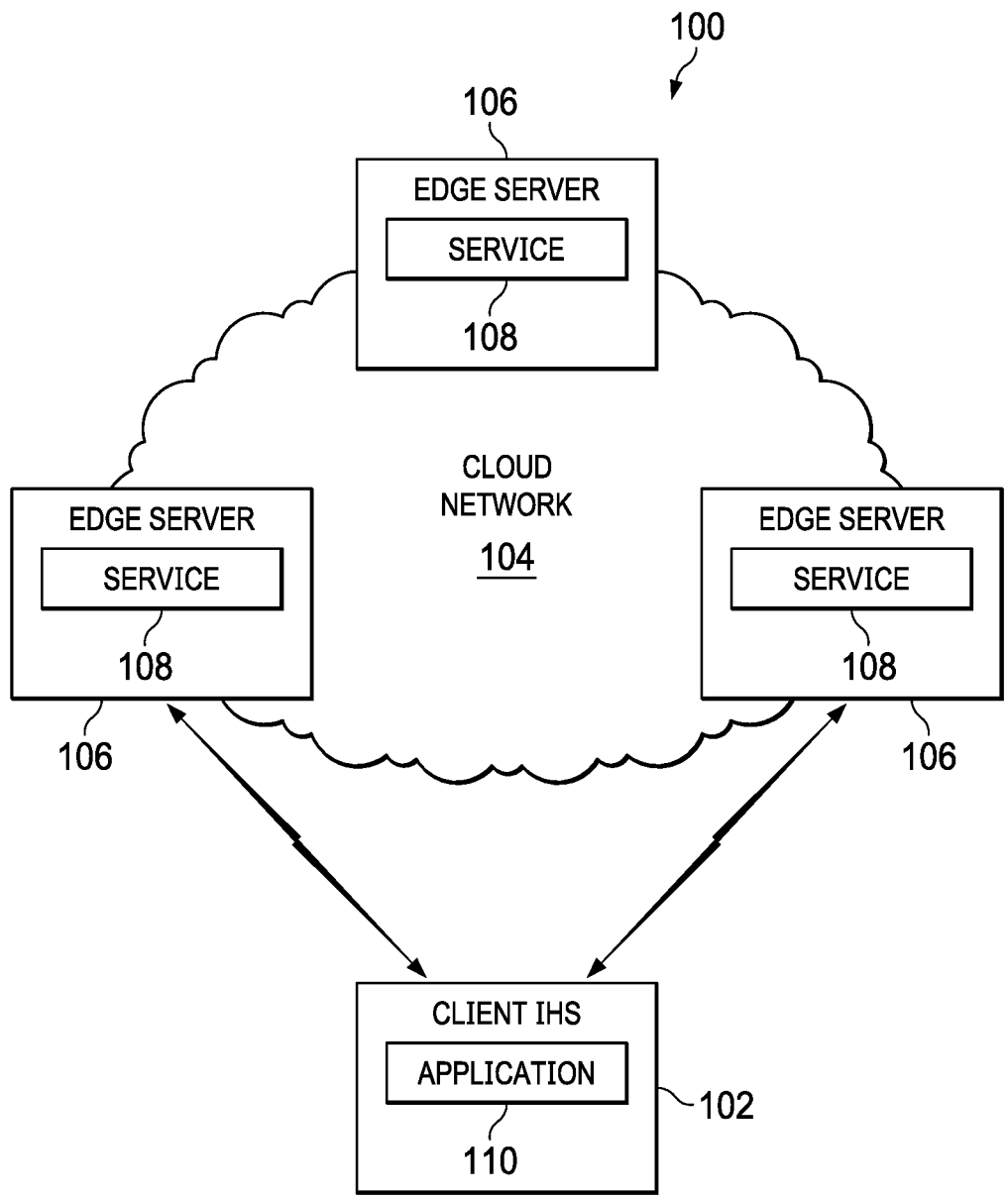
FIG. 1 illustrates an example client driven cloud network access system according to one embodiment of the present disclosure.

FIG. 1 illustrates an example client driven cloud network access system 100 according to one embodiment of the present disclosure. System 100 includes a client IHS 102 in communication with a cloud network 104, which in this particular example, is a fifth generation (5G) cellular network. Cloud network 104 includes multiple edge servers 106 that are each configured to provide a particular service 108 to an application 110 executed on client IHS 102. As will be described in detail herein below, client IHS 102 includes executable logic or instructions that, upon request from application 110, generate an aggregated data packet including the request, a requested performance level to be provided by the service, and application telemetry data associated with a measured performance level of the application, and transmits the aggregated data packet to each available edge server 106 in the cloud network 104. In response, each available edge server 106 generates a response including an advertised performance level that is transmitted back to client IHS 102. Given the advertised performance level obtained from each edge server 106, client IHS 102 may select one edge server to provide the service 108 for the application 110.

By enabling client IHS 102 to select one from among multiple edge servers 106 to provide the service, client IHS 102 may be enabled to select a service that optimally meets the needs of the application 110. Since the cloud network 104, such as the 5G network is software defined, desired features and profiles of the network may be adjusted based on workload types, profiles, settings, and the like. Additionally, because 5G slicing can be extended to the client IHS 102, it can provide intelligence to assign specific workloads to one of many slices over the same network to meet the requirements (e.g., QoS) specified by the application 110.

Using 5G cellular technologies, edge servers 106 have been deployed at or near base stations to provide lower latency and higher bandwidth by eliminating or reducing communication through the network to application servers. As such, certain edge servers 106 may be capable of providing better performance than their other edge server counterparts. Embodiments of the present disclosure leverage this capability by enabling client IHS 102 to select one edge server 106 to provide the desired service. Additionally, an iterative ML technique may be performed by both client IHS 102 and edge server 106 to optimize performance of both application 110 and service 108 provided by edge server 106 thus yielding an affinity between the application 110 and selected service 108 so that when a request for the service 108 is issued by the client IHS 102 in the future, the affinity between the selected service 108 and application 110 may allow the edge server 106 to advertise better estimated performance levels than other servers in the cloud network 104.

As used herein, an edge server 106 can be any electronic device capable of interacting or communicating with other electronic or logical elements over cloud network 104. Examples of such an edge server can include a router, modem, network gateway, consumer media server, set top box, media recorder, firewall, and the like. In one embodiment, edge server 106 may be configured in close proximity to a base station or radio access network (RAN) for communicating wirelessly with client IHS 102.

Although each edge server 106 is shown executing a single service 108, it should be appreciated that each edge server 106 may execute multiple services 108 for application 110 executed on client IHS 102. In one embodiment, one or more edge servers 106 may be configured in a zone (e.g., Amazon Web Services (AWS)™), in which each edge server 106 executes multiple services 108 (e.g., Amazon elastic compute cloud (EC2)™) instances as a virtual private cloud (VPC) for client IHS 102. Given such an architecture, certain services 108 provided by the VPC may be distributed across multiple edge servers 106 so that client IHS 102 may select one or more services 108 (e.g., Amazon EC2 instances) from any one or a group of edge servers 106. Additionally, each edge server 106 may be configured to execute multiple services 108 according to the requirements of the application 110. Such an architecture may enable the VPC to be scalable in order to meet the processing requirements for the application 110. That is, as application needs increase, more services 108 (EC2 instances) may be instantiated, and conversely; as application needs decrease, certain services 108 (EC2 instance) may be deleted to reduce processing load on its respective edge server 106. Embodiments of the present disclosure may expand upon this architecture by enabling the application 110 to select which services 108 from each edge server 106 are used so that the application 110 makes optimal use of the services 108 provided from the VPC.

Types of services that may be provided by edge server 106 include multi-media (voice, video) communications, ultra-high definition (UHD) video, gaming services, services provided to "Internet of things" (IOT) devices, self-driving cars services, industry automation, and the like. Each of these services require different communication performance parameters to function properly. For example, viewing of ultra-high definition (UHD) video or 3D video requires massive bandwidth with some reliability and latency requirements, while IOT devices exemplified by interacting sensors triggering a staggering number of messages, machine interactions, and automated actions may be required high reliability. Also, self-driving cars are expected to be particularly reliant on fast and reliable messaging. Other services may include industry automation, which can be viewed as communications similar to mission critical IOT, but with more relaxed timing and reliability needs with higher data needs, perhaps for interfacing with humans. Multi-media (voice, video) communications, gaming, and UHD/3D video may involve communication to or with a human, and therefore have certainly latency/reliability requirements largely due to individual's reliance on feedback. Gaming differs somewhat in that it needs more data bandwidth than voice/video communications, but has similar latency/reliability requirements. Additionally, UHD/3D video viewing requires a relatively high level of bandwidth while caching at or near the display device typically results in relaxed latency and reliability requirements. Thus, it can be seen that services provided by the 5G network topology may vary to a relatively large degree such that applications using such services may fully realize the overall performance improvements that can be provided by the new 5G networks.

Figure 2:
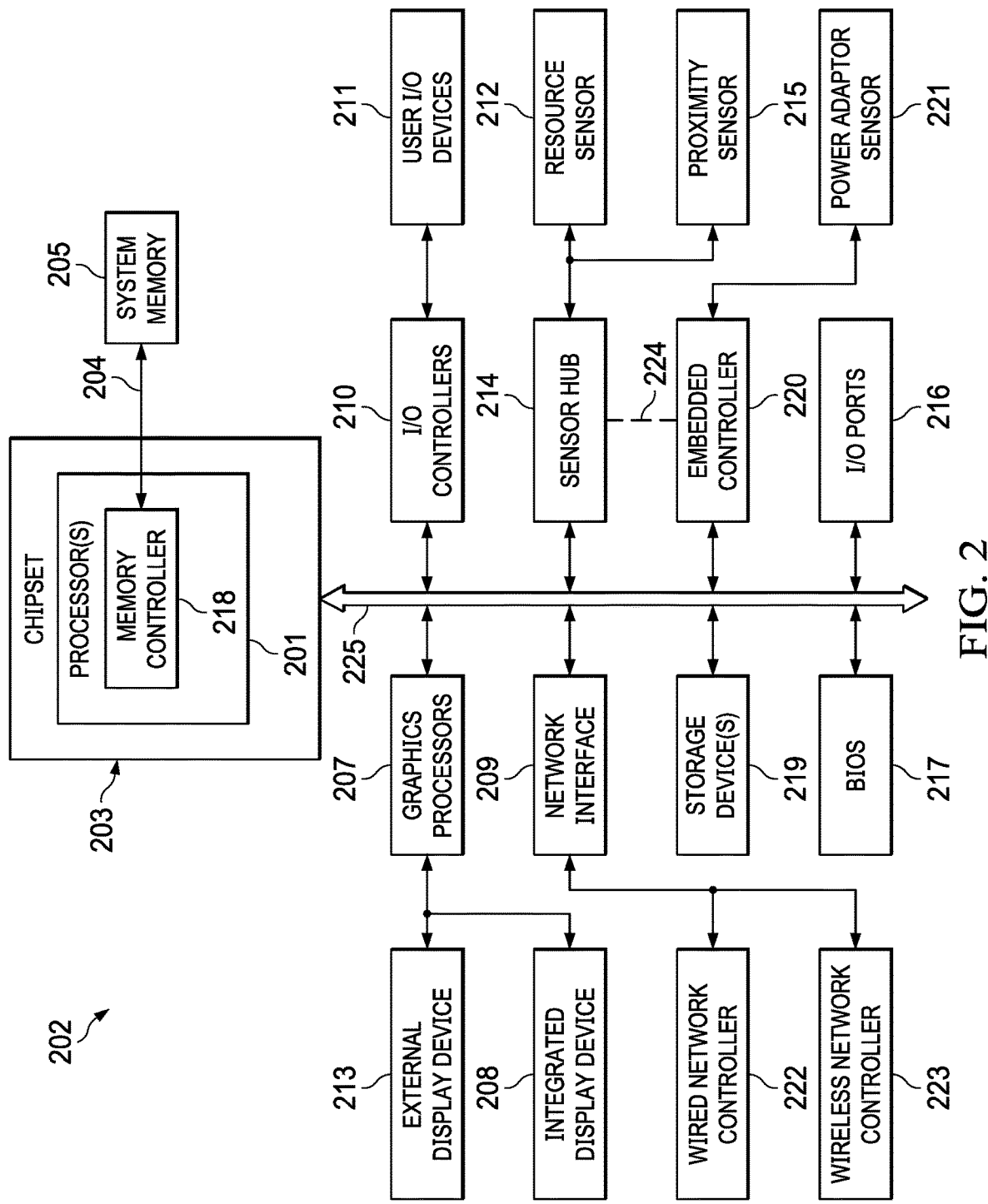
FIG. 2 is a block diagram illustrating example components of example IHS configured to manage a communication link with a wireless docking station according to one embodiment of the present disclosure.

FIG. 2 is a block diagram illustrating components of example IHS 202 configured to manage a communication link with a wireless docking station according to one embodiment of the present disclosure. Certain components of IHS 202 may comprise at least a portion of client IHS 202 or server IHS 106 described above with reference to FIG. 1.

As shown, IHS 202 includes one or more processors 201, such as a Central Processing Unit (CPU), that execute code retrieved from system memory 205. Although IHS 202 is illustrated with a single processor 201, other embodiments may include two or more processors, that may each be configured identically, or to provide specialized processing operations. Processor 201 may include any processor capable of executing program instructions, such as an Intel Pentium™ series processor or any general-purpose or embedded processors implementing any of a variety of Instruction Set Architectures (ISAs), such as the x86, POW-ERPC®, ARM®, SPARC®, or MIPS® ISAs, or any other suitable ISA.

In the embodiment of FIG. 2, processor 201 includes an integrated memory controller 218 that may be implemented directly within the circuitry of processor 201, or memory controller 218 may be a separate integrated circuit that is located on the same die as processor 201. Memory controller 218 may be configured to manage the transfer of data to and from the system memory 205 of IHS 202 via high-speed memory interface 204. System memory 205 that is coupled to processor 201 provides processor 201 with a high-speed memory that may be used in the execution of computer program instructions by processor 201.

Accordingly, system memory 205 may include memory components, such as static RAM (SRAM), dynamic RAM (DRAM), and/or NAND Flash memory, suitable for supporting high-speed memory operations by the processor 201. In certain embodiments, system memory 205 may combine both persistent, non-volatile memory and volatile memory. In certain embodiments, system memory 205 may include multiple removable memory modules.

IHS 202 utilizes chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides processor(s) 201 with access to a variety of resources accessible via bus 225. In IHS 202, bus 225 is illustrated as a single element. Various embodiments may utilize any number of separate buses to provide the illustrated pathways served by bus 225.

In various embodiments, IHS 202 may include one or more I/O ports 216 that may support removable couplings with various types of external devices and systems, including removable couplings with peripheral devices that may be configured for operation by a particular user of IHS 202. For instance, I/O ports 216 may include USB (Universal Serial Bus) ports, by which a variety of external devices may be coupled to IHS 202. In addition to or instead of USB ports, I/O ports 216 may include various types of physical I/O ports that are accessible to a user via the enclosure of the IHS 202.

In certain embodiments, chipset 203 may additionally utilize one or more I/O controllers 210 that may each support the operation of hardware components such as user I/O devices 211 that may include peripheral components that are physically coupled to I/O port 216 and/or peripheral components that are wirelessly coupled to IHS 202 via network interface 209. In various implementations, I/O controller 210 may support the operation of one or more user I/O devices 211 such as a keyboard, mouse, touchpad, touchscreen, microphone, speakers, camera and other input and output devices that may be coupled to IHS 202. User I/O devices 211 may interface with an I/O controller 210 through wired or wireless couplings supported by IHS 202. In some cases, I/O controllers 210 may support configurable operation of supported peripheral devices, such as user I/O devices 211.

As illustrated, a variety of additional resources may be coupled to the processor(s) 201 of the IHS 202 through the chipset 203. For instance, chipset 203 may be coupled to network interface 209 that may support different types of network connectivity. IHS 202 may also include one or more Network Interface Controllers (NICs) 222 and 223, each of which may implement the hardware required for communicating via a specific networking technology, such as Wi-Fi, BLUETOOTH, Ethernet and mobile cellular networks (e.g., CDMA, TDMA, LTE). Network interface 209 may support network connections by wired network controllers 222 and wireless network controllers 223. Each network controller 222 and 223 may be coupled via various buses to chipset 203 to support different types of network connectivity, such as the network connectivity utilized by IHS 202.

Chipset 203 may also provide access to one or more display device(s) 208 and 213 via graphics processor 207. Graphics processor 207 may be included within a video card, graphics card or within an embedded controller installed within IHS 202. Additionally, or alternatively, graphics processor 207 may be integrated within processor 201, such as a component of a system-on-chip (SoC). Graphics processor 207 may generate display information and provide the generated information to one or more display device(s) 208 and 213, coupled to IHS 202.

One or more display devices 208 and 213 coupled to IHS 202 may utilize LCD, LED, OLED, or other display technologies. Each display device 208 and 213 may be capable of receiving touch inputs such as via a touch controller that may be an embedded component of the display device 208 and 213 or graphics processor 207, or it may be a separate component of IHS 202 accessed via bus 225. In some cases, power to graphics processor 207, integrated display device 208 and/or external display device 213 may be turned off, or configured to operate at minimal power levels, in response to IHS 202 entering a low-power state (e.g., standby).

As illustrated, IHS 202 may support an integrated display device 208, such as a display integrated into a laptop, tablet, 2-in-1 convertible device, or mobile device. IHS 202 may also support use of one or more external display devices 213, such as external monitors that may be coupled to IHS 202 via various types of couplings, such as by connecting a cable from the external display device 213 to external I/O port 216 of the IHS 202. In certain scenarios, the operation of integrated displays 208 and external displays 213 may be configured for a particular user. For instance, a particular user may prefer specific brightness settings that may vary the display brightness based on time of day and ambient lighting conditions.

Chipset 203 also provides processor 201 with access to one or more storage devices 219. In various embodiments, storage device 219 may be integral to IHS 202 or may be external to IHS 202. In certain embodiments, storage device 219 may be accessed via a storage controller that may be an integrated component of the storage device. Storage device 219 may be implemented using any memory technology allowing IHS 202 to store and retrieve data. For instance, storage device 219 may be a magnetic hard disk storage drive or a solid-state storage drive. In certain embodiments, storage device 219 may be a system of storage devices, such as a cloud system or enterprise data management system that is accessible via network interface 209.

As illustrated, IHS 202 also includes Basic Input/Output System (BIOS) 217 that may be stored in a non-volatile memory accessible by chipset 203 via bus 225. Upon powering or restarting IHS 202, processor(s) 201 may utilize BIOS 217 instructions to initialize and test hardware components coupled to the IHS 202. BIOS 217 instructions may also load an operating system (OS) (e.g., WINDOWS, MACOS, iOS, ANDROID, LINUX, etc.) for use by IHS 202.

BIOS 217 provides an abstraction layer that allows the operating system to interface with the hardware components of the IHS 202. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 202 embodiments may utilize sensor hub 214 capable of sampling and/or collecting data from a variety of sensors. For instance, sensor hub 214 may utilize hardware resource sensor(s) 212, which may include electrical current or voltage sensors, that are capable of determining the power consumption of various components of IHS 202 (e.g., CPU 201, GPU 207, system memory 205, etc.). In certain embodiments, sensor hub 214 may also include capabilities for determining a location and movement of IHS 202 based on triangulation of network signal information and/or based on information accessible via the OS or a location subsystem, such as a GPS module.

In some embodiments, sensor hub 214 may support proximity sensor(s) 215, including optical, infrared, and/or sonar sensors, which may be configured to provide an indication of a user's presence near IHS 202, absence from IHS 202, and/or distance from IHS 202 (e.g., near-field, mid-field, or far-field).

In certain embodiments, sensor hub 214 may be an independent microcontroller or other logic unit that is coupled to the motherboard of IHS 202. Sensor hub 214 may be a component of an integrated system-on-chip incorporated into processor 201, and it may communicate with chipset 203 via a bus connection such as an Inter-Integrated Circuit ($I^2C$) bus or other suitable type of bus connection. Sensor hub 214 may also utilize an $I^2C$ bus for communicating with various sensors supported by IHS 202.

As illustrated, IHS 202 may utilize embedded controller (EC) 220, which may be a motherboard component of IHS 202 and may include one or more logic units. In certain embodiments, EC 220 may operate from a separate power plane from the main processors 201 and thus the OS operations of IHS 202. Firmware instructions utilized by EC 220 may be used to operate a secure execution system that may include operations for providing various core functions of IHS 202, such as power management, management of operating modes in which IHS 202 may be physically configured and support for certain integrated I/O functions.

EC 220 may also implement operations for interfacing with power adapter sensor 221 in managing power for IHS 202. These operations may be utilized to determine the power status of IHS 202, such as whether IHS 202 is operating from battery power or is plugged into an AC power source (e.g., whether the IHS is operating in AC-only mode, DC-only mode, or AC+DC mode). In some embodiments, EC 220 and sensor hub 214 may communicate via an out-of-band signaling pathway or bus 224.

In various embodiments, IHS 202 may not include each of the components shown in FIG. 2. Additionally, or alternatively, IHS 202 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as an SoC.

Figure 3:
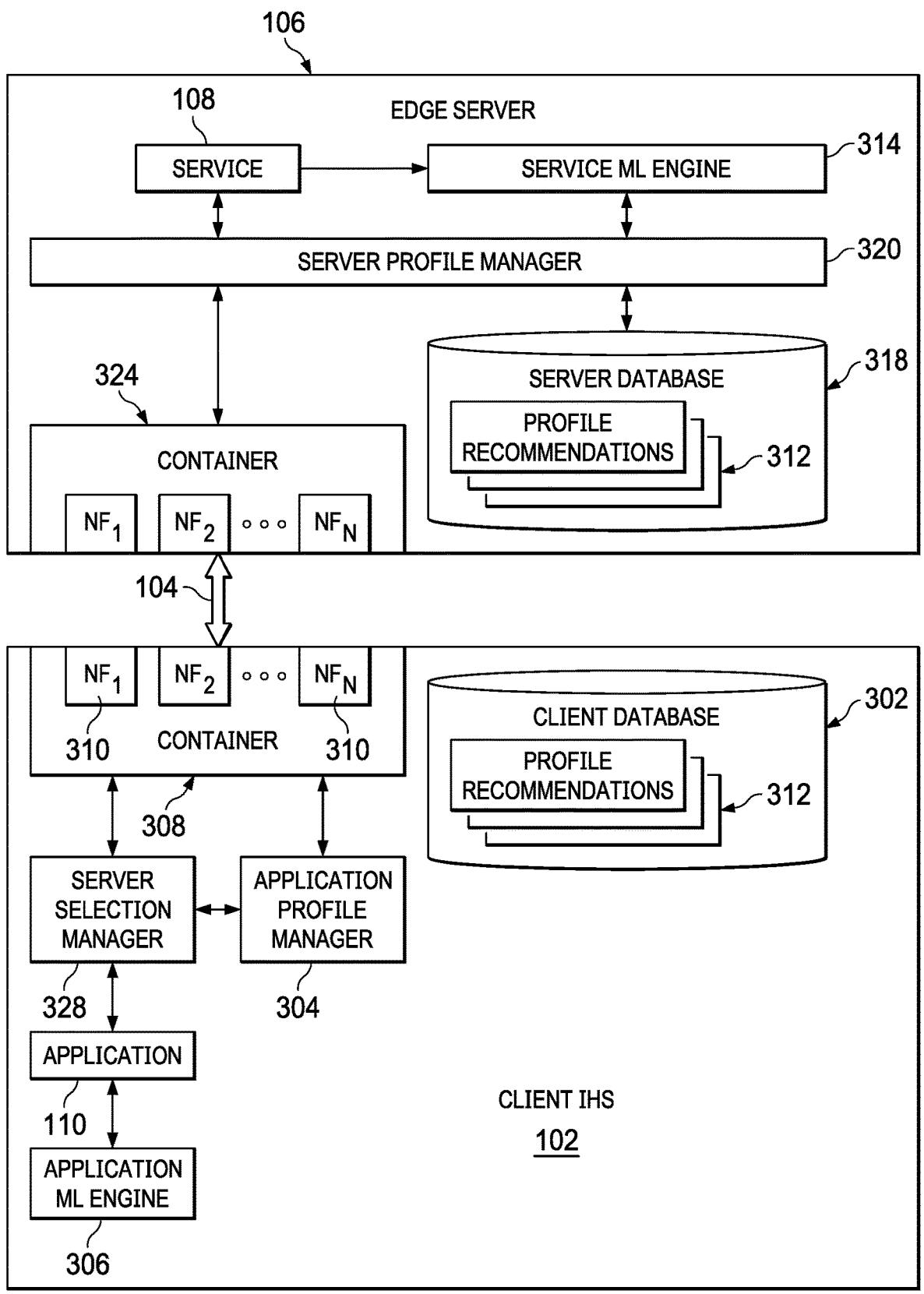
FIG. 3 illustrates several elements of each of a client IHS and an edge server that may be implemented to perform the various features of the client driven cloud network access system 100 according to one embodiment of the present disclosure.

FIG. 3 illustrates several elements of each of a client IHS 202 and a server IHS 106 that may be implemented to perform the various features of the cloud network interconnection system 100 according to one embodiment of the present disclosure. As shown, client IHS 202 communicates with a server IHS 106 via a communication network 104, such as a 5G telecommunications network.

In general, fifth generation (5G) cellular networks support large bandwidth communications, of up to 10 gigabits per second, and make new applications possible. 5G also introduces the concept of cellular network slicing. In particular, 5G network slicing enables the multiplexing of virtualized and independent logical networks on the same physical network infrastructure. Each network slice is an isolated end-to-end network tailored to fulfill diverse Quality-of-Service or "QoS" requirements requested by a given application.

Client IHS 102 may represent a wireless communication device (e.g., a phone, a tablet, a watch, a laptop, etc.) associated with a user or recipient of intended wireless communication. Client IHS 102 includes application ML engine 306, a client database 302, and an application profile manager 304 that communicates with one or more applications 108 configured on client IHS 102 to produce a system for optimizing the performance of application 110. application ML engine 306 receives telemetry data associated with operation of application 110, and classifies network traffic generated by application 110 to use 5G cellular network slices, and generate one or more profile recommendations for optimizing performance of application 110.

Server selection manager 328 may operate as a software agent, in whole or in part, on client IHS 102 to process requests from application 110 to perform an operation, and communicate with multiple edge servers 106 configured in cloud network 104 to select one edge server 106 for providing the service for the application 110. For example, server selection manager 328 may obtain a requested performance level along with telemetry data associated with the application 110 to generate an aggregated data packet that is transmitted to each edge server 106. When a response to the aggregated data packet from each edge server 106 is received, the server selection manager 328 may then select one edge server 106 according to its advertised performance level, and configure the application 110 to communicate with the selected edge server 106 to provide the service to the application 110.

Server selection manager 328 may obtain the requested performance level from any suitable source. In one embodiment, server selection manager 328 may obtain the requested performance level directly from the requesting application 110. In another embodiment, server selection manager 328 may obtain the requested performance level from a lookup table stored in a memory (client database 302) of client IHS 102 in which the lookup table includes entries for each application 110 and a requested performance level to be associated with the application 110. Server selection manager 328 may also obtain the telemetry data from any suitable source including directly from application 110, or from the memory of client IHS 102 in which telemetry data obtained from a previous operation performed by the application 110 has been stored.

Aggregating the requested performance level and telemetry data along with the request enables it to be self-describing. Moreover, including the requested performance level and telemetry data provides most or all information needed to supply the requested service, thus negating the need to obtain particular information (e.g., configuration information associated with client IHS 102 and/or application 110) that would otherwise be required in order to establish effective communications between application 110 and its requested service. Additionally, because the aggregated data packet is self-describing, it can be efficiently conveyed between application 110, and service 108 in a connectionless environment, and switched between services provided by multiple edge servers 106 configured in cloud network 104.

In one embodiment, server selection manager 328 may include a unique identifier (UID) with the aggregated data packet. The UID may be included so that operations may be performed statelessly. That is, the UID may be included with each request so that each operation can be uniquely identified for, among other things, maintaining status and context of each operation. For example, if communication with a first edge server 106 is lost during execution of an operation, the system 100 may automatically select another second edge server 106 to complete the operation, picking up where the first edge server 106 left off. In effect, the UID serves as an identifier to the cloud network 104 to utilize any and all edge servers 106 in cloud network 104 to complete each requested operation, while maintaining a status and context of how the operation is performed by each edge server 106.

Application profile manager 304 may operate as a software agent, in whole or in part, on the client IHS 102 to receive profile recommendations from application ML engine 306 to adjust one or more settings of client IHS 102 to optimize performance of application 110. In one embodiment, application profile manager 304 may be configured to provision a container 308 comprising one or more network functions (NFs) 310. Examples of such containers may include DOCKER, or one that provides clusters of orchestrated containers, such as KUBERNETES. Although application profile manager 304 is shown and described herein to provision a container 308 when requested by client IHS 102, it should be appreciated that application profile manager 304 may be configured to provision other interfaces (e.g., NFs) to communication networks, such as physical machines (bare metal machines), virtual machines (VMs), and the like when requested by application 110.

In general, the network functions 310 in container 308 may be used to support communication between client IHS 102 and server IHS 106. That is, NFs 310 are the nodes in the 5G system architecture that provide services for the clients and servers in the network. Examples of network functions (NFs) may include a HTTPS server NF, a database NF, a network element NF, such as a routing function, a host firewall NF, a packet gateway NF, and the like. In many cases, it would be beneficial to specify parameters for these NFs as they are being provisioned to optimize communication over the network according to a service type (e.g., eMBB, uRLLC, mMTC, and/or some combination thereof). According to embodiments of the present disclosure, application profile manager 304 receives profile recommendations from application ML engine 306 and selects parameters for the NFs 310 that optimize communication through the 5G network.

Client database 302 is provided for storage of profile recommendations 312 generated by application profile manager 304. When application ML engine 306 generates profile recommendations, they are provided to application profile manager 304 for optimization of application, and to a server profile manager 320 for optimization of service 108. Application profile manager 304 also stores the profile recommendations 312 in database 302 for later use. For example, During a first use of application 110, application profile manager 304 may work in conjunction with server profile manager 320 for cooperative optimization of application 110 and service 108 provided to application 110. Because the profile recommendations 312 are stored, when the application 110 is used at a later date or time to access service 108, application profile manager 304 may access the stored profile recommendations for further optimization of the application 110 and the corresponding service 108 used by the application 110.

As shown, server IHS 106 may represent a single IHS 104 that serves one or more services 106 to applications 108 upon demand. In other embodiments, server IHS 106 may represent multiple IHSs 104 that function together in order to serve one or more services 106 to application 110. Server IHS 106 includes service 108, service ML engine 314, a server database 318, and a server profile manager 320 that communicates with one or more services 106 configured on server IHS 106 to produce a system for providing services 106 to client IHS 102 using profile recommendations obtained from service ML engine 314 as well as profile recommendations obtained from application ML engine 306.

Service ML engine 314 receives telemetry data associated with operation of service 108, and generates one or more profile recommendations for optimizing performance of service 108. Server profile manager 320 may operate as a software agent, in whole or in part, on server IHS 106 to receive profile recommendations from service ML engine 314 and adjust one or more settings of service 108 to optimize its performance. Similar to application profile manager 304, server profile manager 320 may be configured to provision a container 324 comprising one or more network functions 326 that function as an interface to the communication network 104.

Application ML engine 306 and service ML engine 314 each monitors data associated with the operation of target application 110 and service 108 to characterize their performance. For example, application ML engine 306 or service ML engine 314 may each obtain telemetry data from other process running on client IHS 102 and/or directly from sensors (e.g., 212, 215, 221) configured in IHS 100 to determine one or more performance features associated with target application 110 or service 108, respectively. In various embodiments, application ML engine 306 or service ML engine 314 may obtain telemetry data from an energy estimation engine, such as the MICROSOFT E3 engine, which is configured to provide energy usage data broken down by applications, services, tasks, and/or hardware in an IHS. In some cases, the process (e.g., energy estimation engine) may use software and/or hardware sensors configured to determine, for example, whether target application 110 is being executed in the foreground or in the background (e.g., minimized, hidden, etc.) of the IHS's graphical user interface (GUI).

Figure 4:
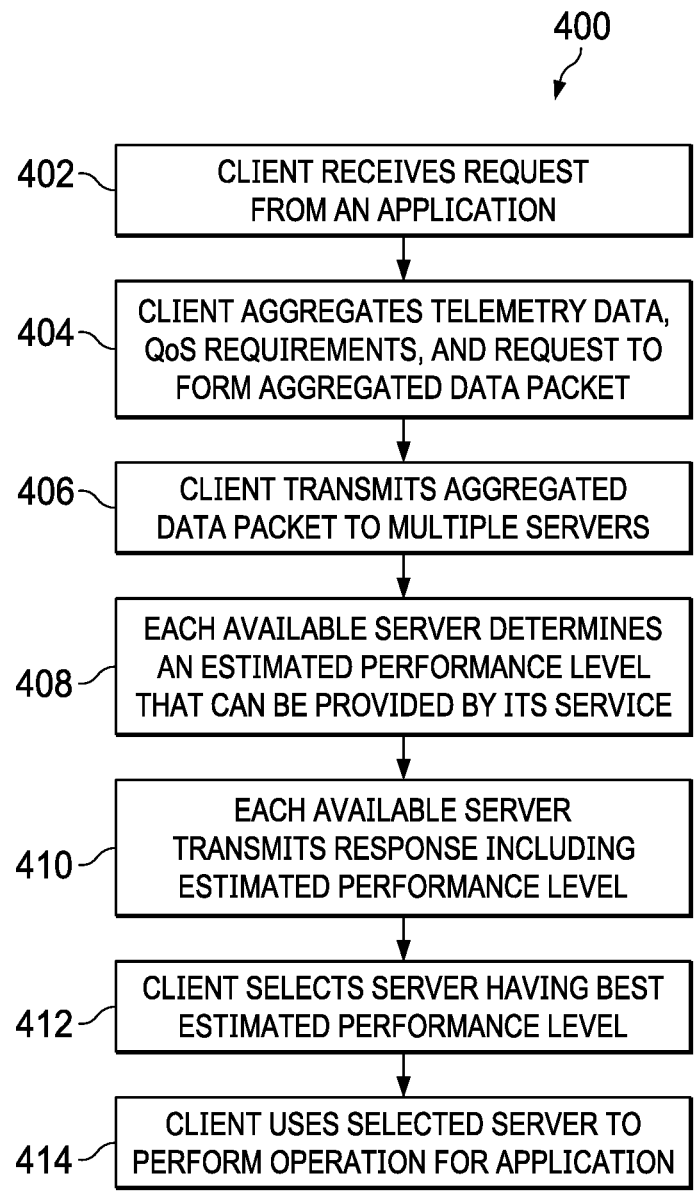
FIG. 4 illustrates an example cloud service selection method that may be performed by, elements in the system to provide interconnection between a client IHS and one or more edge servers that provide a service for the client IHS according to one embodiment of the present disclosure.

Once application ML engine 306 or service ML engine 314 has collected characteristics over a period of time, it may then process the collected data using statistical descriptors to extract the application performance features of target application 110 or service 108, respectively. For example, application ML engine 306 and service ML engine 314 may monitor their respective IHSs over time to estimate their resource usage with respect to various aspects, such as which actions performed by target application 110 cause certain resources to encounter loading, events occurring on client IHS 102 that causes target application 110 to require a relatively high level of resource usage, and a time of day in which these actions are encountered. Once application ML engine 306 and service ML engine 314 have collected characteristics over a period of time, they may then process the collected data using statistical descriptors to extract the application performance features associated with target application 110 or service 108. Both or either of service ML engine 314 and application ML engine 306 may use a machine learning algorithm such as, for example, a Bayesian algorithm, a Linear Regression algorithm, a Decision Tree algorithm, a Random Forest algorithm, a Neural Network algorithm, or the like. In one embodiment, application profile manager 304 and/or server profile manager 320 may include features, or form a part of, the DELL PRECISION OPTIMIZER FIG. 4 illustrates an example method 400 that may be performed by elements in the system 100 to provide interconnection between a client IHS 102 and one or more edge servers 106 that provide a service for the client IHS 102 according to one embodiment of the present disclosure. For example, the steps of the disclosed method 400 may be performed each time an application 110 requests to perform an operation via a service 108 provided through cloud network 104.

Initially at step 402, client IHS 102 receives a request from an application 110 to perform an operation. The operation may be any type that may be provided by a cloud related service, such as a multimedia (audio, video) session, a teleconference session, a gaming session, or an IOT data acquisition and/or control session. Client IHS 102 then at step 404 aggregates telemetry telemetry data. QoS requirements, and request to form an aggregated data packet, which is then transmitted to multiple edge servers 106 in cloud network 104 that provide the requested service 108 at step 406.

At step 408, each available edge server 106 receives aggregated data packet and determines an estimated performance level that can be provided by its service 108. For example, edge server 106 may assess the performance level of service 108 by accessing telemetry data associated with the service 108, and telemetry data associated with the application 110 to derive the estimated performance level that can be provided by the service 108. In one embodiment, edge server 106 may access profile recommendations 312 stored in server memory 318 to identify any optimizations to the performance of service 108 that have been provided by service ML engine 314 during execution of a previous operation of service 108 as described below with reference to FIG. 5. Using profile recommendations obtained during a previous operation conducted by service 108 may, in some cases, yield an affinity between the application 110 and the service 108 performed for the application 110. That is, because profile recommendations provided by service ML engine 314 have enhanced the performance of service 108, it can advertise better estimated performance levels to client IHS 102 than other edge servers 106 that have not undergone any ML technique with the application 110, Thereafter at step 410, each available edge server 106 transmits its respective estimated performance level back to the client HS 102.

At step 412, client HIS 102 selects one edge server from among the multiple available edge servers 106 according to the estimated performance level advertised by each. That is, client IHS 102 may select the edge server 106 having performance parameters (e.g., throughput, latency, reliability, etc.) that most closely matches the QoS requirements of the application 110. Client IHS 102 then at step 414 uses the selected edge server 106 to perform the operation for the application 110.

Figure 5A:
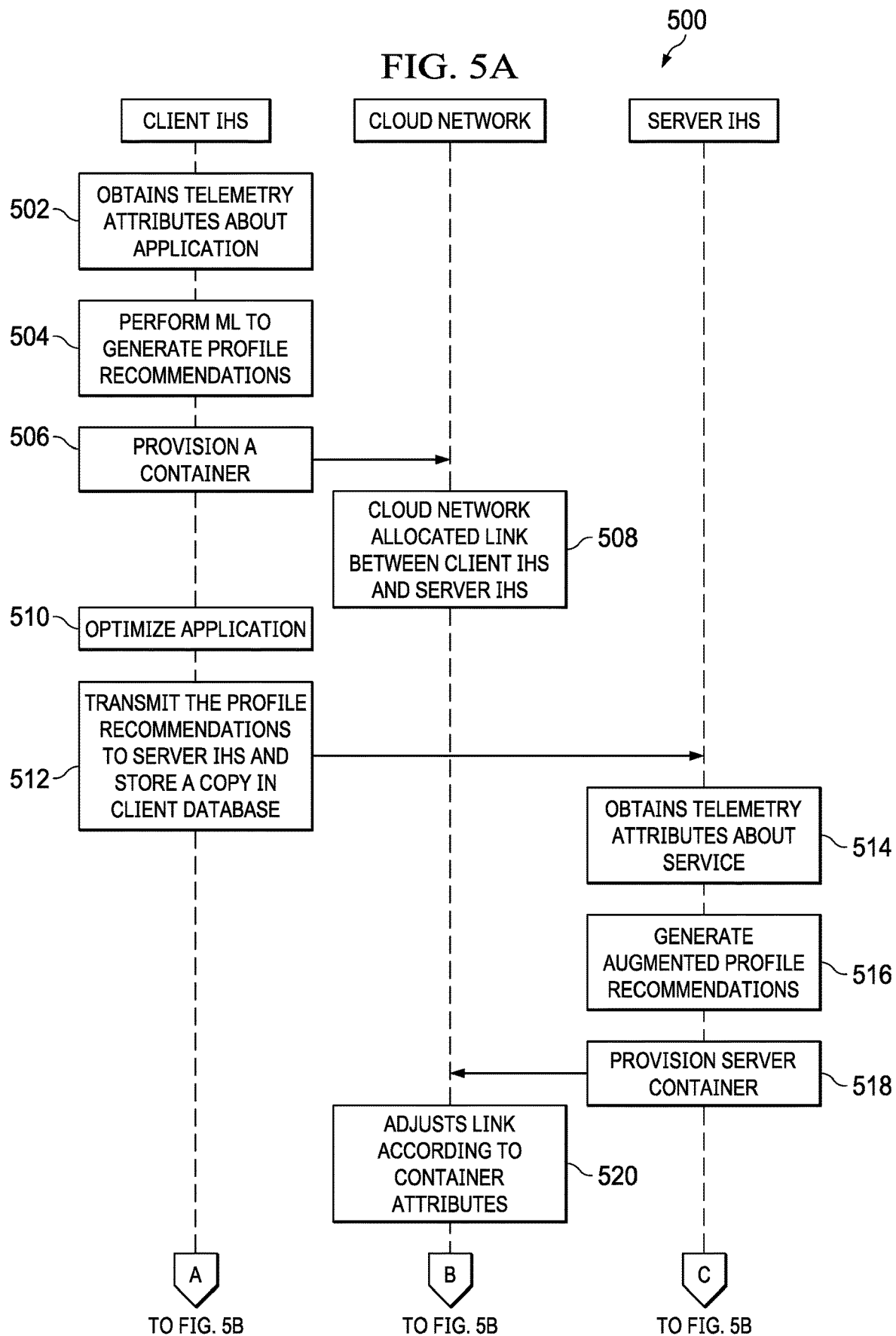
FIGS. 5A and 5B illustrate an example optimization method depicting how client IHS may function with the edge server to provide and end-to-end (E2E) optimization of a service provided to the application.
Figure 5B:
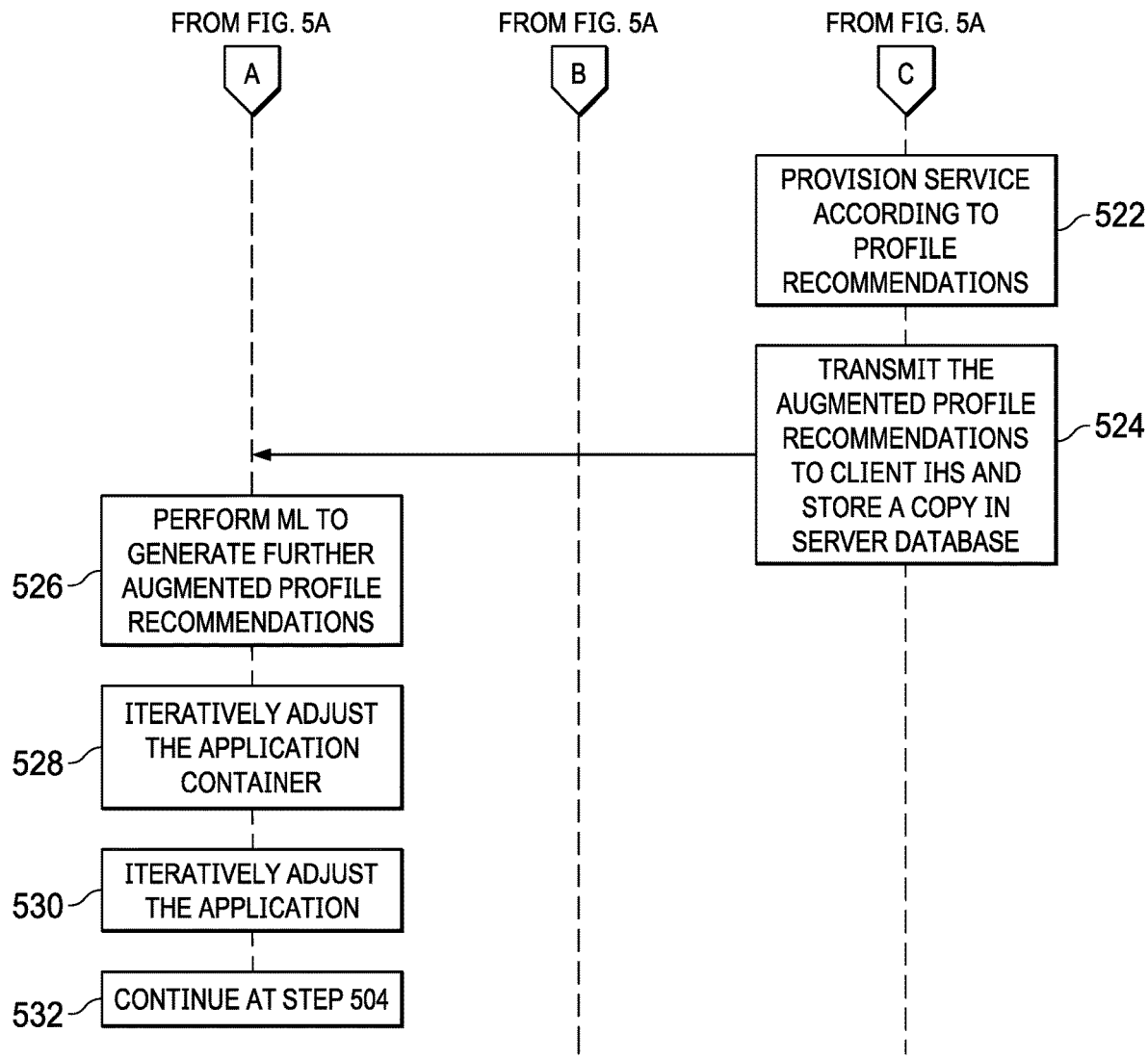

FIG. 5 illustrates an example optimization method 500 depicting how client IHS 102 may function with server IHS 106 to provide and end-to-end (E2E) optimization of a service 108 provided to an application 110. In particular, steps 502-506, 510, 512, and 526-530 are those that may be performed by client IHS 102, steps 514-518, 522, and 524 are those that may be performed by server IHS 106, and steps 508 and 520 are those that may be performed by cloud communication network 104. It is important to note that the steps of the disclosed method 500 may be performed multiple times during a communication session between client IHS 102 and server IHS 106 to iteratively optimize performance of application 110 and service 108. That is, the steps may be performed a first time to initially set up a link (e.g., slice) between client IHS 102 and server IHS 106 and cooperatively optimize performance of application 110 and service 108, and at a later point in time, perform the steps of the method 500 again to iteratively enhance performance of the application 110 and service 108.

At step 502, application profile manager 304 obtains telemetry attributes about application 110. If the method 500 is being performed for the first time, application profile manager 304 may obtain telemetry data about application 110 that has been obtained during a previous use of application 110, such as when the application 110 accessed a different service from cloud communication network 104. Additionally, application profile manager 304 may obtain generic information about a service type (e.g., eMBB, uRLLC, mMTC) that may be associated with the application 110 to obtain the telemetry data. If, however, the method 500 is being performed again, application profile manager 304 may obtain telemetry attributes associated with the application 110 that has been obtained since the previous time that method 500 was performed. These telemetry attributes may be used by application ML engine 306 to generate initial profile recommendations to application profile manager 304 at step 504. Thereafter at step 506, application profile manager 304 provisions a container 308 for establishing communication through the cloud communication network 104 based on the profile recommendations received from application ML engine 306. The cloud communication network 104 then receives attributes associated with the container 308 to allocate a link between client IHS 102 and server IHS 106 at step 508. In a particular embodiment in which cloud communication network 104 comprises a 5G network, a slice may be instantiated.

At step 510, application profile manager 304 optimizes application 110 according to the profile recommendations generated by application ML engine 306. Application profile manager 304 may optimize application in any suitable manner. In one embodiment, application profile manager 304 optimizes application 110 by optimizing one or more resources, such as CPU 201, GPU 207, and/or storage (e.g., system memory 205), that are used to support execution of application 110 on client IHS 102. For example, application profile manager 304 may optimize CPU 201 by adjusting a power level applied to the CPU, adjusting an overclocking or underclocking level of the CPU. Application profile manager 304 may also optimize GPU 207 by adjusting one or more of a frame rate, often rated in frames per second (FPS), a refresh rate, or a computational frame rate of the GPU. For another example, application profile manager 304 may optimize storage (e.g., system memory 205) by adjusting a write optimized setting or a read optimized setting of the storage unit, or by increasing or decreasing its cache size in RAM memory to handle the level of load incurred by the storage resource.

At step 512, application profile manager 304 transmits the profile recommendations to server IHS 106 and stores a copy (e.g., snapshot) of the profile recommendations in client database 302. service ML engine 314 receives these profile recommendations and, along with telemetry data obtained about service 108, generate augmented profile recommendations to server profile manager 320 at step 516. Within this disclosure, augmented profile recommendations refers to profile recommendations associated with service 108 that have been augmented to include profile recommendations generated according to operation of application 110.

Thereafter at step 518, server profile manager 320 provisions a server container 324 for establishing communication through the cloud communication network 104 to communicate with application 110 running on client IHS 102 using augmented profile recommendations obtained from both application ML engine 306 and service ML engine 314. Cloud communication network 104 then adjusts link (e.g., slice) according to the attributes generated in the server container 324 at step 520.

Server profile manager 320 also provisions service 108 using the augmented profile recommendations provided by service ML engine 314 and application ML engine 306 at step 522. For example, server profile manager 320 may provision service 108 by adjusting the resources (e.g., CPU, GPU, storage, etc.) of the server IHS 106 used to support or execute the service 108. At step 524, server profile manager 320 transmits the augmented profile recommendations to client IHS 102, and stores a copy in server database 318.

At step 526, application ML engine 306 generates further augmented profile recommendations based upon the augmented profile recommendations obtained from server profile manager 320 along with its profile recommendations generated at step 504. At step 528, application profile manager 304 uses the further augmented profile recommendations to iteratively adjust the settings associated with client container 308 to iteratively enhance its performance, and at step 530, it uses those further augmented profile recommendations to iteratively adjust setting associated with application 110.

At step 532, the method continues processing at step 504 to iteratively optimize service and link according to application requirements. That is, as application 110 continues to use service 108, the steps of method 500 may be repeatedly be performed for further optimization of both application 110 and service 108. The steps of method 500 may be repeated at any suitable time. For example, the steps of method 500 may be continually performed at specified ongoing time intervals (e.g., every 5 seconds, every 30 seconds, every 2 minutes, etc.) so that the performance of application 110 and service 108 can be continually optimized. In another embodiment, either or both of application profile manager 304 or server profile manager 320 may be triggered to perform the steps of method 500 when a specified threshold of a particular telemetry data element has been crossed, such as when a user begins to use application 110 in a different manner, thus yielding a new set of profile recommendations that should be used to optimize performance of each of the application 110 and the service 108 used by application 110. In yet another embodiment, the steps of method 500 may be performed again, even after a period of time in which application 110 does not use or access service 108, such as when the client IHS 102 is turned off, or when application 110 is not being currently executed on client IHS 102. In such a case, when application 110 again requests to communicate with service 108, application profile manager 304 may access client database 302 to determine whether profile recommendations for that application 110 requesting to use the specified service 108 are found, and if so, application profile manager 304 may access the profile recommendations 312 stored in client database 302, and continue operation through the other steps of method 500.

At this point, service 108 has been provisioned for use by application 110 and a communication link is established between client IHS 102 and server IHS 106 so that application 110 may consume resources (e.g., information, calculations, algorithms, etc.) provided by service 108. Moreover, both application 110 and service 108 have been optimized based upon telemetry data obtained about their own operation as well as the operation of each other.

Nevertheless, when use of the method 500 is no longer needed or desired, the method 500 ends.

Although FIG. 5 describes one example of a process that may be performed by IHS 100 for enhancing a performance level of a target application 110 and a service 108 provided to application 110, the features of the disclosed process may be embodied in other specific forms without deviating from the spirit and scope of the present disclosure. For example, certainly steps of the disclosed process may be performed sequentially, or alternatively, they may be performed concurrently. As another example, the method 500 may perform additional, fewer, or different operations than those operations as described in the present example. As yet another example, the steps of the process described herein may be performed by a computing system other than client IHS 102, such as by another cloud service existing in the cloud network that communicates with client IHS 102 to implement the ML enhancement features described above.

Figure 6:
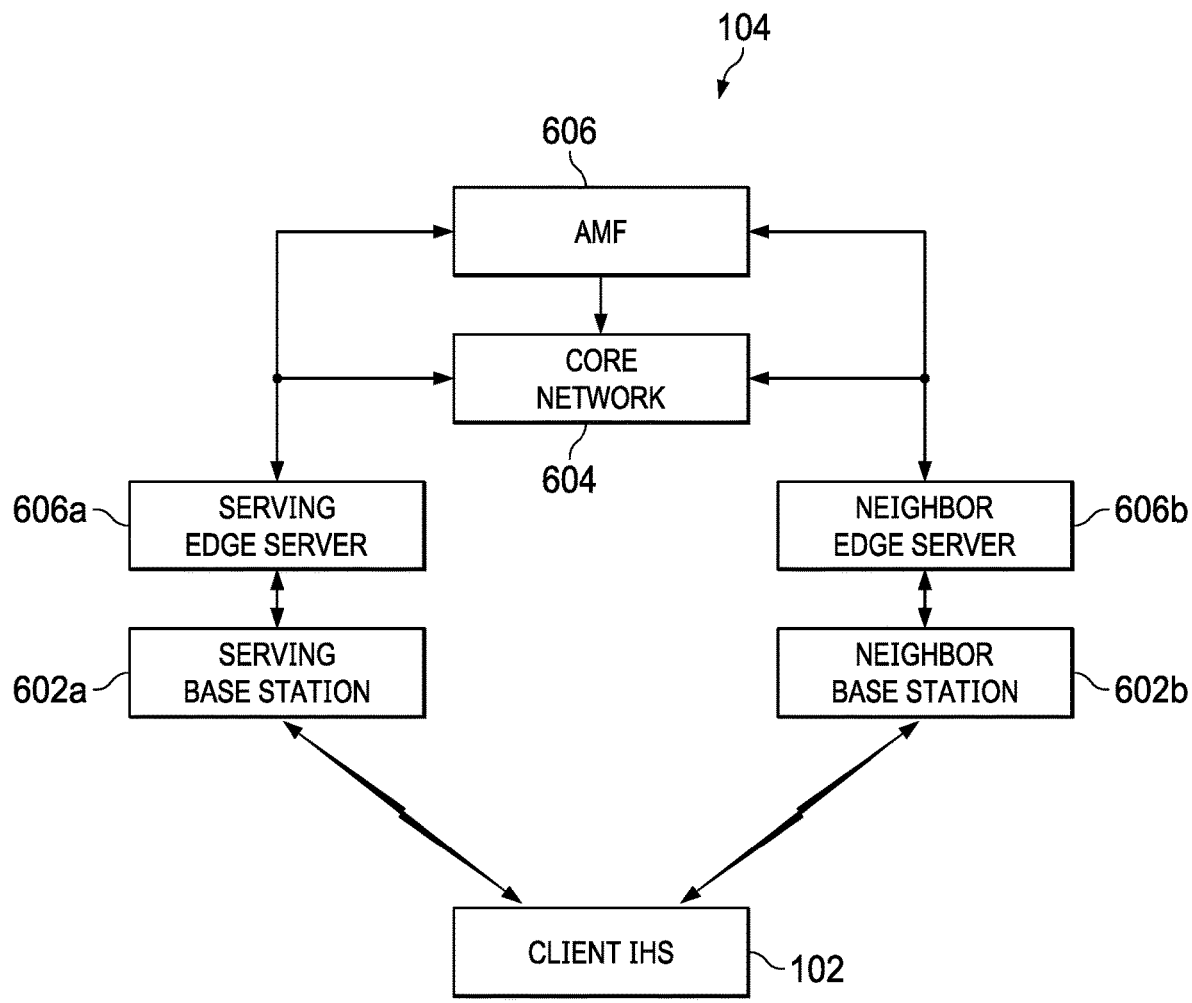
FIG. 6 illustrates several elements of an example cloud network that may be used to implement a handover procedure from one edge server to another edge server according to one embodiment of the present disclosure.

FIG. 6 illustrates several elements of cloud network 104 that may be used to implement a handover procedure from one edge server 606a to another edge server 606b according to one embodiment of the present disclosure. The elements of cloud network 104 include a serving base station 602a, a neighbor base station 602b in communication with a core network 604 to form a wireless network. Serving base station 602a, neighbor base station 602b along with other base stations (not shown) in cloud network 104 form a radio access network, such as an evolved universal terrestrial radio access network (E-UTRAN). Serving edge server 606a and neighbor edge server 606b communicate with client IHS 102 via serving base station 602a and neighbor base station 602b, respectively, using any suitable protocol, such as an Xe interface.

Cloud network 104 also includes an access and mobility function (AMF) 606 that provides control functions, such as authentication of client IHS 102, authorization, mobility management, and the like. In general, AMF 606 provides functions, such as granting access to edge servers 606a, 606b by client IHS 102, managing mobility of applications and associated data and context of the applications between edge servers 606a, 606b. According to embodiments of the present disclosure, AMF 606 may also be configured to perform a handover operation of a service provided by serving edge server 606a to a similar service provided by neighbor edge server 606b. As will be described in detail below, AMF 606 may use a unique identifier (UID) included in an aggregated data packet received from client IHS 102 to handover (e.g., switch) to neighbor edge server 606b from serving edge server 606a, while allowing client IHS 102 to determine which neighbor edge server 606b from among multiple neighbor edge servers that may be available. Although only one neighbor base station 602b, edge server 606b combination is shown, it should be understood that cloud network 104 may provide multiple, alternative neighbor base station 602b, edge server 606b combinations without departing from the spirit and scope of the present disclosure.

Figure 7:
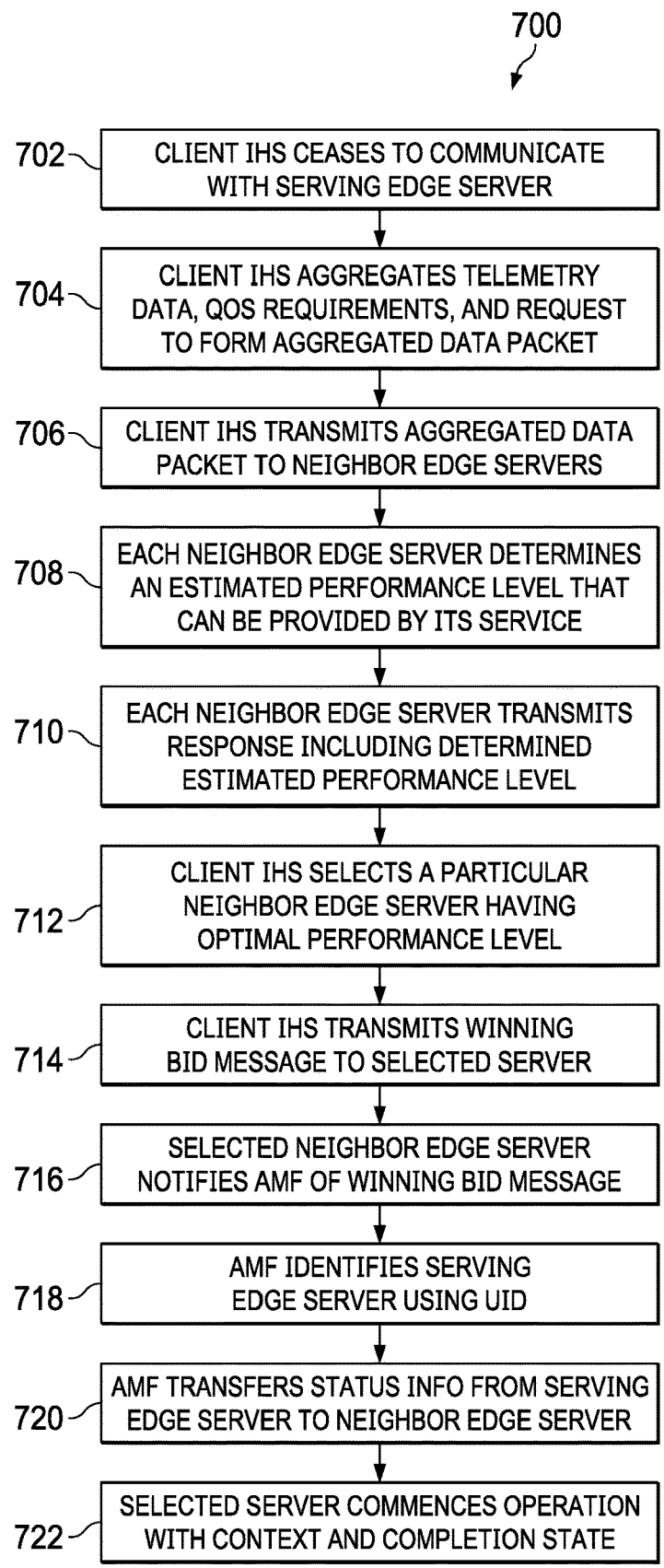
FIG. 7 illustrates an example handover method that may be performed by the client driven cloud network access system according to one embodiment of the present disclosure.

FIG. 7 illustrates an example handover method 700 that may be performed by the client driven cloud network access system according to one embodiment of the present disclosure. Initially, client IHS 102 is currently consuming a service provided by serving edge server 606a, such as one where the service was initiated by performing the steps of the edge server selection method 400 described above with reference to FIG. 4.

At step 702, client IHS 102 ceases to communicate with edge server 606a. Client IHS 102 may cease to communicate with edge server 606a for any of several reasons. For example, client IHS 102 may cease to communicate with edge server 606a due to loss of wireless link, or the edge server 606a ceasing to function properly. In response, Client IHS 102 aggregates the telemetry data and QoS requirements associated with the application 110 along with a request to form an aggregated data packet at step 704. The client IHS 102 then at step 706 transmits the aggregated data packet to multiple neighbor edge servers 106 in cloud network 104.

At step 708, each available neighbor edge server 106 receives the aggregated data packet and determines an estimated performance level that can be provided by its service 108. As described previously, each neighbor edge server 106 access profile recommendations 312 stored in server database 318 to identify any optimizations to the performance of service 108 that have been provided by service ML engine 314 during execution of a previous operation of service 108 to determine the estimated performance level that it can advertise. Each available edge server 606a, 606b then transmits its respective estimated performance level back to the client IHS 102 at step 710.

At step 712, client IHS 102 selects one neighbor edge server from among the multiple neighbor edge servers 106 having an optimal estimated performance level according to its QoS requirements throughput, latency, reliability, etc). Client IHS 102 then transmits a winning bid message to the selected neighbor edge server 106 indicating that it has been selected to provide the service at step 714. In response, neighbor edge server 606b notifies AMF 606 of winning bid message at step 716. The winning bid message may include the UID that was transmitted in the aggregated data packet to serving edge server 606a at step 506 of the edge server selection method 500.

AMF 606, at step 718, identifies serving edge server 606a from among multiple edge servers in cloud network that performed a portion of the operation using the UID. For example, AMF 606 may identify the serving edge server 606a by broadcasting a query message including the UID to some, most, or all edge servers in cloud network 104, and receiving a response message from the serving edge server 606a having the UID obtained at step 506. As another example, AMF 606 may identify the serving edge server 606a by accessing its memory for a notification message obtained from the serving edge server 606a when it first begins to provide the service at step 514 of the edge server selection method 500. As yet another example, AMF 606 may identify the serving edge server 606a by receiving, from the serving edge server 606a, a notification message including the UID indicating that the consumed service was only partially completed at step 514 of the edge server selection method 500.

Thereafter at step 720, AMF 606 transfers status information about the aborted operation performed by serving edge server 606a to neighbor edge server 606b. AMF 606 may obtain information about how much of the service was provided before it was aborted. For example, if the service was a multimedia presentation that was approximately 7.0 minutes long and was aborted after 1.3 minutes, AMF 606 may provide this information to the neighbor edge server 606b so that the multimedia presentation may be resumed at the 1.3 minute mark by the neighbor edge server 606b. AMF 606 may also obtain context information from serving edge server 606a, such as telemetry data and/or QoS requirements so that the neighbor edge server 606b may resume operation at or near the same performance level as was provide by the serving edge server 606a.

Once the status information has been transferred to neighbor edge server 606b, the neighbor edge server 606b may commence providing the service for client IHS 102 at step 722. The neighbor edge server 606b continues to provide the service until the operation is completed. If, however, the neighbor edge server 606b ceases to complete the operation provided to client IHS 102, the steps of the aforementioned handover process 700 may be performed again to find yet another edge server 106 to provide the service to the client IHS 102. Nevertheless, when use of the handover method 700 is no longer needed or desired, the handover method 700 ends.

Although FIG. 7 describes one example of a handover process that may be performed by cloud network 104 for performing a handover process, the features of the disclosed process may be embodied in other specific forms without deviating from the spirit and scope of the present disclosure. For example, certain steps of the disclosed handover method 700 may be performed sequentially, or alternatively, they may be performed concurrently. As another example, the handover method 700 may perform additional, fewer, or different operations than those operations as described in the present example. As yet another example, the steps of the handover method 700 described herein may be performed by a computing system other than serving edge server 606a and/or neighbor edge server 606b. For example, certain steps as described above may be performed by a network element disclosed above (e.g., core network 604, serving base station 602a, neighbor base station 602b), or any other network element included in cloud network 104.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterward be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
at least one processor; and
at least one memory coupled to the at least one processor, the at least one memory having program instructions stored thereon that, upon execution by the at least one processor, cause the IHS to:
receive, from an application, a request to perform an operation provided by a cloud service;
generate an aggregated data packet comprising the request, a requested performance level to be provided by the cloud service, application telemetry data associated with a measured performance level of the application, and profile recommendations generated by an application machine learning (ML) process using the application telemetry data;
transmit the aggregated data packet to a plurality of servers that are each configured to provide the cloud service, wherein each of the plurality of servers generates a response to the aggregated data packet and transmits the response to the IHS, wherein the response includes an advertised performance level at which a server associated with the response can provide the cloud service;
select one of the plurality of servers according to the advertised performance level;
communicate with the selected server to provide the requested operation,
wherein the selected server is configured to:
obtain service telemetry data associated with a performance of the service;
perform, using the service telemetry data, and the application profile recommendations, a cloud service machine learning (ML) process to generate one or more augmented profile recommendations for optimizing a performance of the cloud service;
store the profile recommendations in a memory of the selected server; and
when a second request is received to perform another operation, use the augmented profile recommendations to calculate the advertised performance level that is sent to the IHS in response to the request.

2. The IHS of claim 1, wherein the selected server is further configured to:
perform, using the application telemetry data included in the aggregated data packet, the cloud service machine learning (ML) process to generate the augmented profile recommendations.

3. The IHS of claim 1, wherein the program instructions are further executed to:
add a unique identifier (UID) to the aggregated data packet, the selected server storing the aggregated data packet in a memory of the server; and
when the selected server does not complete the operation, transmit another aggregated data packet to the plurality of servers, wherein each of the plurality of servers generates a second response to the other aggregated data packet and transmits the second response to the IHS, wherein the second response includes a second advertised performance level at which a second server associated with the second response can provide the cloud service;
select one of the plurality of second servers according to the second advertised performance level; and
communicate with the selected second server to complete the requested operation.

4. The IHS of claim 3, wherein the second server is further configured to:
receive a notification message from the selected server indicating that the selected second server is to complete the requested operation;
identify the selected server from among the plurality of servers that initially provided the cloud service by broadcasting a query message including the UID to each of the plurality of servers, and receiving a response message from the selected server having the UID; and
transfer status information associated with the operation partially performed by the cloud service, the selected second server configured to use the status information to complete the requested operation.

5. The IHS of claim 3, wherein the second server is further configured to:
receive a notification message from the selected server indicating that the selected second server is to complete the requested operation;
identify the selected server from among the plurality of servers that initially provided the cloud service by accessing the server memory to obtain an identity of the first server using the UID; and
transfer status information associated with the operation partially performed by the cloud service, the selected second server configured to use the status information to complete the requested operation.

6. The IHS of claim 3, wherein the second server is further configured to:
receive a notification message from the selected server indicating that the selected second server is to complete the requested operation; and
identify the selected server from among the plurality of servers that initially provided the cloud service by receiving, from the first server, a notification message including the HD indicating that the cloud service was only partially completed on the first server.

7. The IHS of claim 1, wherein the cloud network comprises a fifth generation (5G) technology cellular network.

8. A method comprising:
receiving, instructions stored in at least one memory and executed by at least one processor, from an application, a request to perform an operation provided by a cloud service;
generating, using the instructions, an aggregated data packet comprising the request, a requested performance level to be provided by the cloud service, and application telemetry data associated with a measured performance level of the application, and profile recommendations generated by an application machine learning (ML) process using the application telemetry data;
transmitting, using the instructions, the aggregated data packet to a plurality of servers that are each configured to provide the cloud service, wherein each of the plurality of servers generates a response to the aggregated data packet and transmits the response to the Information Handling System (IHS), wherein the response includes an advertised performance level at which a server associated with the response can provide the cloud service;
selecting, using the instructions, one of the plurality of servers according to the advertised performance level; and
communicating, using the instructions, with the selected server to provide the requested operation;
obtaining, by the selected server, service telemetry data associated with a performance of the cloud service;
performing, by the selected server, using the service telemetry data, and the application profile recommendations, a cloud service machine learning (ML) process to generate one or more augmented profile recommendations for optimizing a performance of the cloud service;
storing, by the selected server, the profile recommendations in a memory of the selected server; and
when a second request is received to perform another operation, using, by the selected server, the stored augmented profile recommendations to calculate the advertised performance level that is sent to the IHS in response to the request.

9. The method of claim 8, further comprising:
performing, using the application telemetry data included in the aggregated data packet, the cloud service machine learning (ML) process to generate the augmented profile recommendations by the selected server.

10. The method of claim 8, further comprising:
adding, by the IHS, a unique identifier (UID) to the aggregated data packet, the selected server storing the aggregated data packet in a memory of the selected server; and
when the selected server does not complete the operation, transmitting, by the IHS, another aggregated data packet to the plurality of servers, wherein each of the plurality of servers generates a second response to the other aggregated data packet and transmits the second response to the IHS, wherein the second response includes a second advertised performance level at which a second server associated with the second response can provide the cloud service;
selecting, by the IHS, one of the plurality of servers according to the second advertised performance level; and
communicating, by the IHS, with the selected second server to complete the requested operation.

11. The method of claim 10, further comprising:
receiving, by the second server, a notification message from the selected server indicating that the selected second server is to complete the requested operation;
identifying, by the second server, the selected server from among the plurality of servers that initially provided the cloud service by broadcasting a query message including the UID to each of the plurality of servers, and receiving a response message from the selected server having the UID; and
transferring, by the server, status information associated with the operation partially performed by the cloud service, the selected second server configured to use the status information to complete the requested operation.

12. The method of claim 10, further comprising:
receiving, by the second server, a notification message from the selected server indicating that the selected second server is to complete the requested operation;
identifying, by the second server, the selected server from among the plurality of servers that initially provided the cloud service by accessing the server memory to obtain an identity of the selected server using the UID and
transferring, by the second server, status information associated with the operation partially performed by the cloud service, the selected second server configured to use the status information to complete the requested operation.

13. The method of claim 10, further comprising:
receiving, by the second server, a notification message from the selected server indicating that the selected second server is to complete the requested operation; and
identifying, by the second server, the selected server from among the plurality of servers that initially provided the cloud service by receiving, from the selected server, a notification message including the UID indicating that the cloud service was only partially completed on the selected server.

14. The method of claim 8, wherein the cloud network comprises a fifth generation (5G) technology cellular network.

15. A memory storage device having program instructions stored thereon that, upon execution by one or more processors of an Information Handling System (IHS), cause the IHS to:
receive, from an application, a request to perform an operation provided by a cloud service;
generate an aggregated data packet comprising the request, a requested performance level to be provided by the cloud service, and application telemetry data associated with a measured performance level of the application, and profile recommendations generated by an application machine learning (ML) process using the application telemetry data;
transmit the aggregated data packet to a plurality of servers that are each configured to provide the cloud service, wherein each of the plurality of servers generates a response to the aggregated data packet and transmits the response to the IHS, wherein the response includes an advertised performance level at which a server associated with the response can provide the cloud service;
select one of the plurality of servers according to the advertised performance level; and
communicate with the selected server to provide the requested operation,
wherein the selected server is configured to:
obtain service telemetry data associated with a performance of the service;
perform, using the service telemetry data, and the application profile recommendations, a cloud service machine learning (ML) process to generate one or more augmented profile recommendations for optimizing a performance of the cloud service;
store the profile recommendations in a memory of the selected server; and
when a second request is received to perform another operation, use the stored augmented profile recommendations to calculate the advertised performance level that is sent to the IHS in response to the request.

16. The memory storage device of claim 15, wherein the selected server is further configured to:
perform, using the application telemetry data included in the aggregated data packet, the cloud service machine learning (ML) process to generate the augmented profile recommendations.

17. The memory storage device of claim 15, wherein the program instructions are further executed to:
add a unique identifier (UID) to the aggregated data packet, the selected server storing the aggregated data packet in a memory of the selected server; and
when the selected server does not complete the operation, transmit a another aggregated data packet to the plurality of servers, wherein each of the plurality of servers generates a second response to the other aggregated data packet and transmits the second response to the IHS, wherein the second response includes a second advertised performance level at which a second server associated with the second response can provide the cloud service;
select one of the plurality of servers according to the second advertised performance level; and
communicate with the selected second server to complete the requested operation.

* * * * *

UNITED STATES PATENT AND TRADEMARK OFFICE
CERTIFICATE OF CORRECTION

PATENT NO. : 11,496,601 B2
APPLICATION NO. : 17/148345
DATED : November 8, 2022
INVENTOR(S) : Khosrowpour et al.

It is certified that error appears in the above-identified patent and that said Letters Patent is hereby corrected as shown below:

In the Claims

In Column 20, Line 15, Claim 6, delete "HD" and insert -- UID -- therefor.

In Column 22, Line 51, Claim 9, delete "a another" and insert -- another -- therefor.

Signed and Sealed this
Thirteenth Day of December, 2022

Katherine Kelly Vidal
*Director of the United States Patent and Trademark Office*